United States Patent
Omagari et al.

(10) Patent No.: US 9,444,974 B2
(45) Date of Patent: Sep. 13, 2016

(54) PRINTING SYSTEM FOR PRINTING PATCHES HAVING DIFFERENT LENGTH TO MEASURE GRADATION VALUES

(75) Inventors: Yuki Omagari, Yokohama (JP); Mitsuru Uratani, Kawasaki (JP); Yuki Ishida, Kawasaki (JP); Seiji Abe, Kawasaki (JP); Masaaki Obayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 12/970,566

(22) Filed: Dec. 16, 2010

(65) Prior Publication Data

US 2011/0149316 A1 Jun. 23, 2011

(30) Foreign Application Priority Data

Dec. 22, 2009 (JP) ................. 2009-290105

(51) Int. Cl.
*H04N 1/60* (2006.01)
*H04N 1/00* (2006.01)

(52) U.S. Cl.
CPC ........ *H04N 1/6033* (2013.01); *H04N 1/00002* (2013.01); *H04N 1/0009* (2013.01); *H04N 1/00015* (2013.01); *H04N 1/00023* (2013.01); *H04N 1/00031* (2013.01); *H04N 1/00045* (2013.01); *H04N 1/00053* (2013.01); *H04N 1/00058* (2013.01); *H04N 1/00063* (2013.01); *H04N 1/00087* (2013.01); *H04N 2201/0006* (2013.01)

(58) Field of Classification Search
CPC .. H04N 1/00045; H04N 1/6033; B41J 2/205
See application file for complete search history.

(56) References Cited

U.S. PATENT DOCUMENTS

| | | | |
|---|---|---|---|
| 2004/0165898 A1* | 8/2004 | Funatani | 399/49 |
| 2006/0093386 A1* | 5/2006 | Oki | 399/49 |
| 2006/0164700 A1* | 7/2006 | Hayashi | 358/518 |
| 2008/0158626 A1* | 7/2008 | Bang et al. | 358/518 |
| 2009/0067007 A1* | 3/2009 | Ishida | 358/3.23 |
| 2009/0154944 A1* | 6/2009 | Kawaguchi | 399/49 |
| 2009/0244154 A1* | 10/2009 | Miyamoto | 347/15 |
| 2010/0008681 A1* | 1/2010 | Nagatsuka | 399/43 |
| 2010/0134858 A1* | 6/2010 | Minamino et al. | 358/504 |

FOREIGN PATENT DOCUMENTS

| | | | |
|---|---|---|---|
| JP | 2000-283852 A | 10/2000 | |
| JP | 2004-237604 A | 8/2004 | |
| JP | 2005-254763 A | 9/2005 | |

OTHER PUBLICATIONS

Machine translation JP Pub 2000283852 to Nishihara Masahiro.*
Machine translation of JP Pub 2000283852 to Nishihara Masahiro.*

* cited by examiner

*Primary Examiner* — Benny Q Tieu
*Assistant Examiner* — Haris Sabah
(74) *Attorney, Agent, or Firm* — Canon U.S.A. Inc., IP Division

(57) ABSTRACT

According to the present invention, patch data is printed in such a manner that the length of a low-optical-density patch is small and the length of a high-optical-density patch is large. In addition, the measurement is performed by a sensor that measures at a constant scanning speed. Therefore, SN of a dark patch having a high optical density is improved, and a patch chart can be measured in a short time.

14 Claims, 11 Drawing Sheets

FIG. 5

PATCH CHART SETTING

501
MEDIUM INFORMATION

MEDIUM NAME: NORMAL PAPER A ▼
PAPER FEED PORT: ROLL PAPER ▼
PAPER SIZE: ISO_A4 ▼
PRINT QUALITY: STANDARD ▼
COLOR CONVERSION: PICTURE MODE (PERCEPTUAL) ▼

502
INPUT DATA

FORMAT: ● RGB  ○ CMYK
COLOR VALUE FILE: D:\data\rgb.txt  [BROWSE...]

503
PATCH MEASUREMENT

DIRECTION OF MEASUREMENT: ● ONE-WAY  ○ TWO-WAY
PATCH SORTING: ● ON  ○ OFF 504        505
START      Cancel

FIG. 7

```
#npatch=729
#datatype=RGB
#inputbits=8
0,0,0
0,0,32
0,0,64
 .
 .
 .
255,255,192
255,255,224
255,255,255
END
```

FIG. 8

| PATCH NUMBER | R | G | B | | P |
|---|---|---|---|---|---|
| 1 | 0 | 0 | 0 | | 8 |
| 2 | 0 | 0 | 32 | | 8 |
| 3 | 0 | 0 | 64 | | 7 |
| 4 | 0 | 0 | 96 | | 7 |
| 5 | 0 | 0 | 128 | | 7 |
| . | . | . | . | | . |
| . | . | . | . | | . |
| . | . | . | . | | . |
| 363 | 128 | 128 | 64 | | 5 |
| 364 | 128 | 128 | 96 | | 5 |
| 365 | 128 | 128 | 128 | | 5 |
| 366 | 128 | 128 | 160 | | 5 |
| 367 | 128 | 128 | 192 | | 4 |
| . | . | . | . | | . |
| . | . | . | . | | . |
| . | . | . | . | | . |
| 725 | 255 | 255 | 128 | | 4 |
| 726 | 255 | 255 | 160 | | 3 |
| 727 | 255 | 255 | 192 | | 3 |
| 728 | 255 | 255 | 224 | | 2 |
| 729 | 255 | 255 | 255 | | 2 |

PRINTING SYSTEM FOR PRINTING PATCHES HAVING DIFFERENT LENGTH TO MEASURE GRADATION VALUES

BACKGROUND OF THE INVENTION

1. Field of the Invention

The present invention relates to a printing system, a printing method, an image processing system, and an image processing method for printing a patch that is measured by a sensor in order to obtain a measurement value.

2. Description of the Related Art

In recent years, many image output apparatuses, such as large ink-jet printers, equipped with a colorimetric device are in the marketplace. Such a colorimetric device is used for color calibration for correcting the print color density of a printer and stabilizing colors or to create an ICC profile. Colorimetric devices are mounted in various ways such as mounted on a carriage portion of the print head or provided in such a manner that a colorimetric device unit is attached and fixed to the paper ejection portion. Measurement methods of the colorimetric devices include contact and non-contact methods. In a contact method, measurement is performed while a colorimetric device is in contact with a paper sheet in order to eliminate the influence of outside light, and therefore the colorimetric device needs to stop on the paper sheet during the measurement. However, in a non-contact method, measurement can be performed by scanning a paper sheet without stopping. In Japanese Patent Laid-Open No. 2000-283852, a technique in which colors are measured while a non-contact sensor is scanning without having to stop the scanning head is proposed. The purpose of the invention described in Japanese Patent Laid-Open No. 2000-283852 is to perform color measurement of multiple color patches efficiently. A certain amount of time is required for the color measurement of a patch in the case where the patch is measured while the head is being moved in the width direction of a medium. Accordingly, color measurement can be performed without stopping the head by setting the long side of each patch to a length larger than the length obtained by multiplying the moving speed of the head by the time required for the color measurement by the head, and by shifting the color measurement start coordinates relative to the coordinates of the boundary of each patch.

Meanwhile, as a colorimetric device embedded in commercially available printers, a colorimetric device constituted by a sensor which is manufactured at relatively low cost compared to an ordinary expensive colorimetric device is often used. Although noise is always present in a signal received by a sensor, the noise does not pose a problem when the signal received by the sensor is sufficiently large with respect to the noise, that is, when the signal-to-noise (SN) ratio is large. However, for a high-optical-density patch, that is a dark patch, a signal to be received becomes small and the relative proportion of the noise components becomes large, and thus the SN ratio deteriorates. In particular, in an inexpensive sensor, since the SN ratio, which is the ratio of a signal value to noise, is small and thus the relative ratio of noise to a signal value becomes large, noise has a large impact on the signal value, thereby reducing the accuracy of measurement.

The countermeasures to this problem may include, for example, increasing the light quantity, and increasing the amplification factor. In the case of increasing the light quantity, problems such as a thermal problem and a change in the spectral characteristics of the light sources may occur and, in addition, a bright patch may cause signal saturation. Also in the case of increasing the amplification factor, a bright patch is likely to cause signal saturation and, in addition, the noise itself may be amplified. Further, a colorimetric sensor, in general, performs color measurement after calibrating white balance, however, since the color measurement needs to be performed under the same conditions as those used when the calibration is performed in order to prevent the above-mentioned error, changing the light quantity or the amplification factor for each patch during the color measurement may increase the colorimetric error.

Therefore, an averaging procedure is generally used as a typical technique. Random noise generated while the sensor performs measurement tends to converge to zero by averaging out in terms of time. That is, by increasing the measurement time and increasing the number of averaging operations in terms of time, the relative noise ratio can be lowered, whereby the accuracy can be improved.

FIGS. 1A and 1B explain the SN ratio in the case where patches are measured by a sensor. FIG. 1A illustrates signal values when a low-optical-density patch, that is a patch producing a high reflected signal value, is measured. Meanwhile, FIG. 1B illustrates signal values when a high-optical-density patch, that is a patch producing a low reflected signal value, is measured. Although the signal values contain random noise, the influence of the noise is small when the reflected signal values are large, as in FIG. 1A, and therefore the measurement can be performed within a relatively short measurement time t1. Multiple samplings are performed during the measurement time t1 and then the averaging procedure is performed. Meanwhile, since the influence of the noise is large when the reflected signal values are small, as in FIG. 1B, the measurement time t1 is not sufficient to ensure the accuracy. Therefore, a measurement time t2, which is longer than t1, is required. In this case, the averaging procedure is performed during the measurement time t2 by using more samplings than those in the case of FIG. 1A.

However, in order to converge the noise components to near zero in the averaging procedure, it is necessary to take a longer measurement time for darker patches, thereby taking a longer time to measure the whole patch chart. In the case where the sensor measures a patch chart while moving thereover, the measurement time for each patch needs to be adjusted to a period of time in which the darkest patch can be stably measured. However, if the length of each patch is adjusted to the length with which the darkest patch can be measured stably, there is a problem in that the total measurement time for measuring all the patches becomes longer.

SUMMARY OF THE INVENTION

In view of the foregoing issues, the present invention provides a printing system and an image processing system that can print patches with which high accuracy measurement can be performed in a short time even when a sensor measures the patches while relatively moving over a paper sheet.

In order to solve the issues, the printing system of the present invention includes a storage unit configured to store patch image data to be used to print multiple patches including a first patch and a second patch having an optical density lower than that of the first patch, a printing unit configured to print the multiple patches on a recording medium on the basis of the patch image data, and a sensor configured to optically measure the multiple patches while moving relative to the recording medium at a constant speed, wherein the printing unit performs printing in such a manner that the length of the first patch in the relative movement direction is larger than the length of the second patch in the relative movement direction.

According to the present invention, by generating patch image data having a patch length corresponding to the optical density of the patch, advantages are obtained in that SN for a high-optical-density patch is improved and a patch chart can be measured in a short time.

Further features of the present invention will become apparent from the following description of exemplary embodiments with reference to the attached drawings.

BRIEF DESCRIPTION OF THE DRAWINGS

FIG. 5 is a diagram illustrating user interface (UI) for patch chart setting.

FIG. 7 is a diagram illustrating an example of color value data to be input.

FIG. 8 is a diagram illustrating the correspondence between RGB values and patch lengths P.

DESCRIPTION OF THE EMBODIMENTS

Best mode embodiments of the present invention will be described below in detail with reference to the drawings.
First Embodiment
<Schematic Configurations of Devices>

Figure 1A:
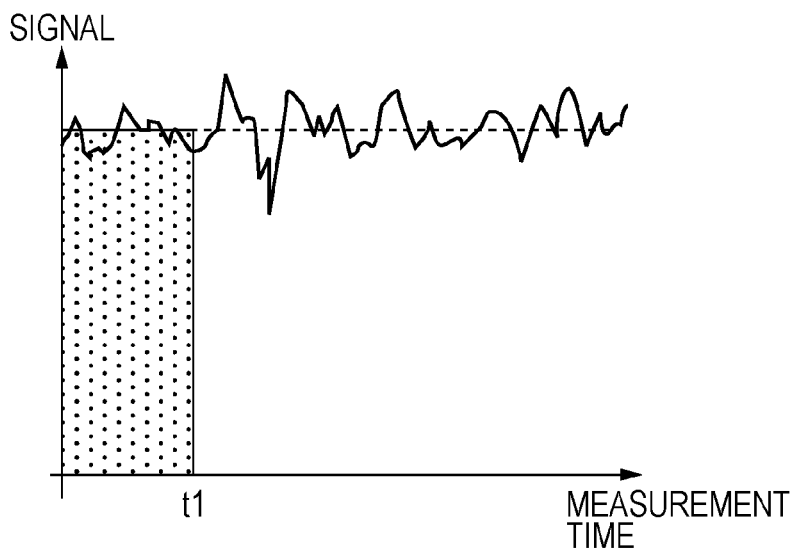
FIGS. 1A and 1B are diagrams for explaining SN ratio.
Figure 1B:
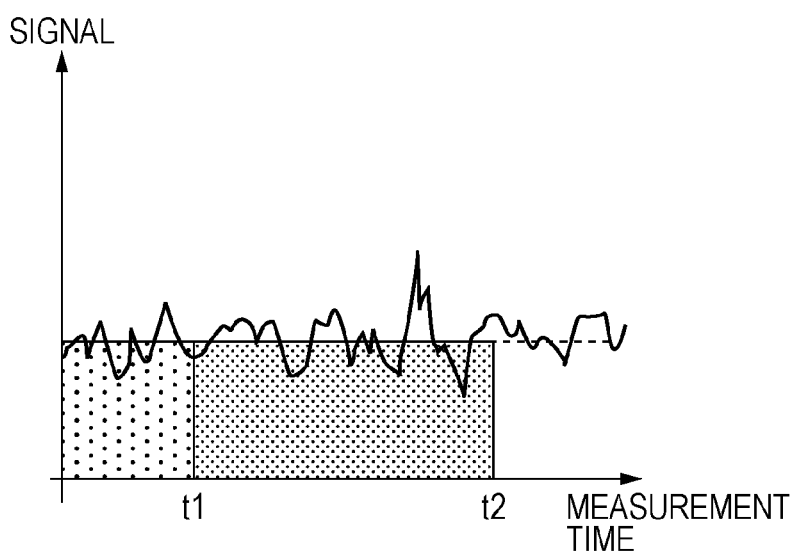
Figure 2A:
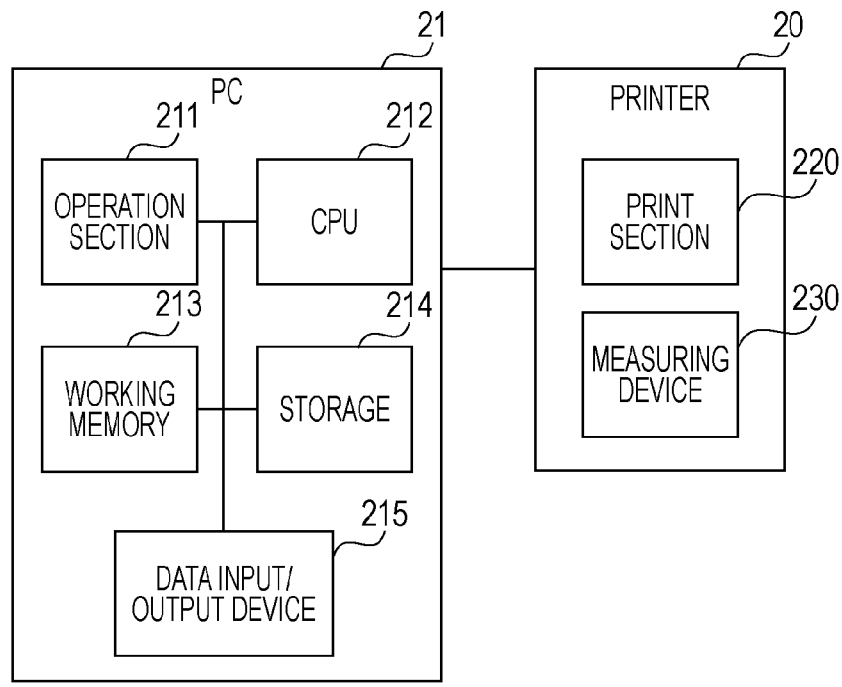
FIGS. 2A and 2B are diagrams illustrating a configuration example to which the present invention can be applied.

FIG. 2A shows a first configuration of an image processing system in an embodiment of the present invention.

Figure 3:
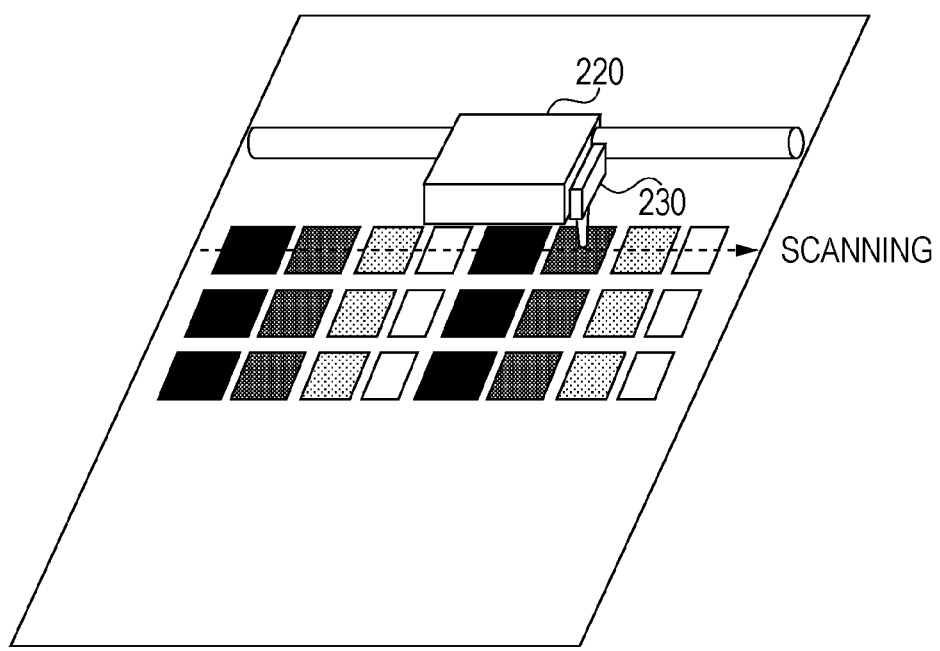
FIG. 3 is a diagram illustrating a second configuration example to which the present invention can be applied.

In this embodiment, an ink-jet printer is used as a typical example. A printer 20 is connected to a personal computer (hereinafter simply referred to as a "PC") 21 as an information processing apparatus and is constituted by a print section 220 for output and a measuring device 230 for measurement. The measuring device receives reflected light of irradiated light by using a sensor embedded in the measuring device and measures the reflectance factor by using the intensity of the light reflected from a target document. As a measuring device, a colorimetric device that uses spectral reflectance factors may be used. In this embodiment, the measuring device 230 is mounted on a movable carriage portion of the print section 220, as shown in FIG. 3, but may be attached to a paper ejection port or connected to an external portion of the printer. However, a measuring method for the measuring device should be a method in which the measuring device performs measurement in a non-contact way while scanning at a predetermined speed without stopping.

The PC 21 performs various processing operations in order to control the printer 20. The PC 21 is constituted by an operation section 211, a CPU 212, a working memory 213, a storage 214, and a data input/output device 215. The operation section 211, which is a user interface (hereinafter referred to as a UI), is provided for input and display for the user, and includes an input device, such as a keyboard or a mouse, and a display device, such as a display. The storage 214 is a storage unit, such as a hard disk, that stores a system program of this embodiment and print data created in the PC 21. The CPU 212 performs control processing for the print section 220 and the measuring device 230 in accordance with the program stored in the storage 214, and the working memory 213 is used as a work area during the processing.

In general, the user can output documents and images, which have been processed with various applications in the PC 21, to the printer 20. That is, images which have been processed as described above by using a print application in the PC 21 are processed with predetermined image processing and sent to a printer driver as print data. The printer driver converts the color of the print data into CMYK colors, which are ink colors of the printer, and then performs half-tone processing and outputs the print data to the printer 20. The printer 20 lays out the data, which has been received from the PC 21 and on which the half-tone processing has been performed, on an output paper sheet to generate a hard copy by using the print section 220. Note that, although the color conversion processing and the half-tone processing are executed by the printer driver in this embodiment, these processing operations may be executed in the printer 20.

Figure 2B:
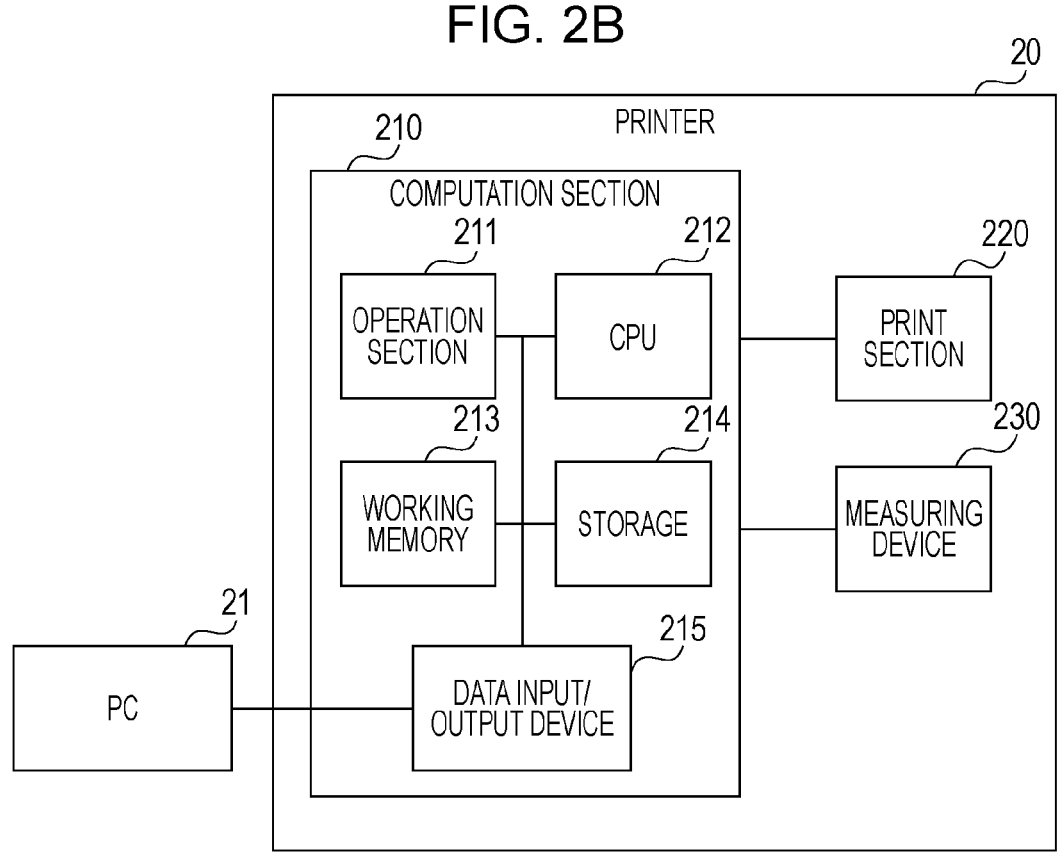

FIG. 2B shows a second configuration of the image processing system in the embodiment of the present invention.

In the second configuration, a computation section 210, instead of the PC 21, is included in the printer 20. The computation section 210 performs various processing operations, as an information processing apparatus, in order to control the print section 220 and the measuring device 230. The computation section 210 is constituted by the operation section 211, the CPU 212, the working memory 213, the storage 214, and the data input/output device 215. The components play the same roles as in the first configuration. In general, the user executes an instruction such as a printing instruction by inputting an instructing using the PC 21 or the operation section 211. However, when an instruction, such as a printing instruction, is provided using the operation section 211, the processing can be completed within the printer 20, and thus the PC 21 is not necessary.

Figure 4:
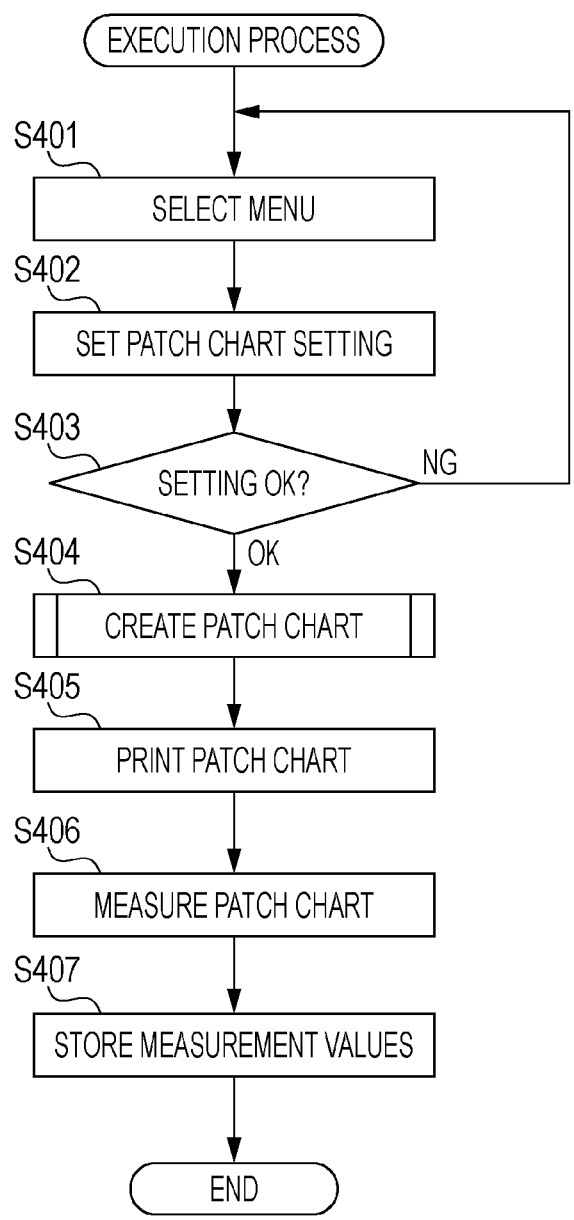
FIG. 4 is a diagram illustrating a process flow of a system to which the present invention can be applied.

FIG. 4 is a flowchart illustrating a schematic flow of the processing from creation of a patch chart to measurement thereof in the first configuration in the image processing system of this embodiment. The flow of execution will be described below in detail along with the flowchart.

First, in step S401, the user starts the program stored in the storage 214 of the PC 21 to display a menu screen for patch chart setting. FIG. 5 is the menu screen showing UI for the patch chart setting.

Next, in step S402, the setting for creation and measurement of a patch chart is set. First, the type of paper, paper feed port and paper size that the printer supports, and the print quality and the color conversion are selected. On an area 501 in FIG. 5, information regarding the medium described above can be selected from pull-down menus. For the paper feed port, a roll paper option, a rear manual paper feed option or the like can be selected. For the paper type, normal paper, coated paper, art paper, gloss paper or the like can be selected. The print quality is selected from among to normal, better, best and the like depending on the paper type. The color conversion is selected from among "picture mode", "bright color", "minimum color difference" and the like which can be set by using the printer driver. If color conversion is not necessary, "no color conversion" can be selected. In an area 502, input data is specified. The format of the input data is selected from RGB and CMYK. Then, by pressing the Browse button, a dialogue (not shown) is displayed, and the file, in which the color value data that is used to create patches is described, is specified thereon. An area 503 is provided for the setting for patch measurement. The direction of measurement is selected from one-way and two-way. For the patch sorting, ON or OFF is selected. The processing of the patch sorting will be described later.

Next, in step S403, the selected items on the patch chart setting are checked for whether the type and size of the paper are supported in the patch printing and whether the input data is valid. When the selected paper is a printable paper sheet and the color value data of the input file is valid, an execution confirmation dialogue is displayed on the screen of the PC 21. When OK is selected, the flow proceeds to the next step. When Cancel is selected, the flow returns into an execution menu display state.

Next, in step S404, a patch chart is created. The patch chart creation is performed in accordance with a method, which will be described later, by the program stored in the storage 214 of the PC 21. When so doing, parameters, such as for the resolution conversion and the error diffusion used for generating patch image data of the patch chart, and an image processing table refer to data stored in the storage 214 of the PC 21. Note that, concurrently with the creation of the patch chart, patch location information which is used when multiple patches are measured is also created.

In step S405, the patch chart is printed. The patch chart printing is performed in accordance with the information of the paper feed port, paper type, paper size, print quality and the color conversion selected in step S402.

In step S406, the patch chart is measured. The measurement is performed by the measuring device 230 mounted on the carriage portion of the print head while scanning the patch chart. This patch chart measurement is performed while the patch location information created in step S404 is being referred to.

Finally, in step S407, the measurement values are stored. The measurement values are converted into a predetermined format and stored in a predetermined region in the storage 214. When storing of the measurement values is completed, the execution process ends.

<Creation of Patch Chart>

Figure 6:
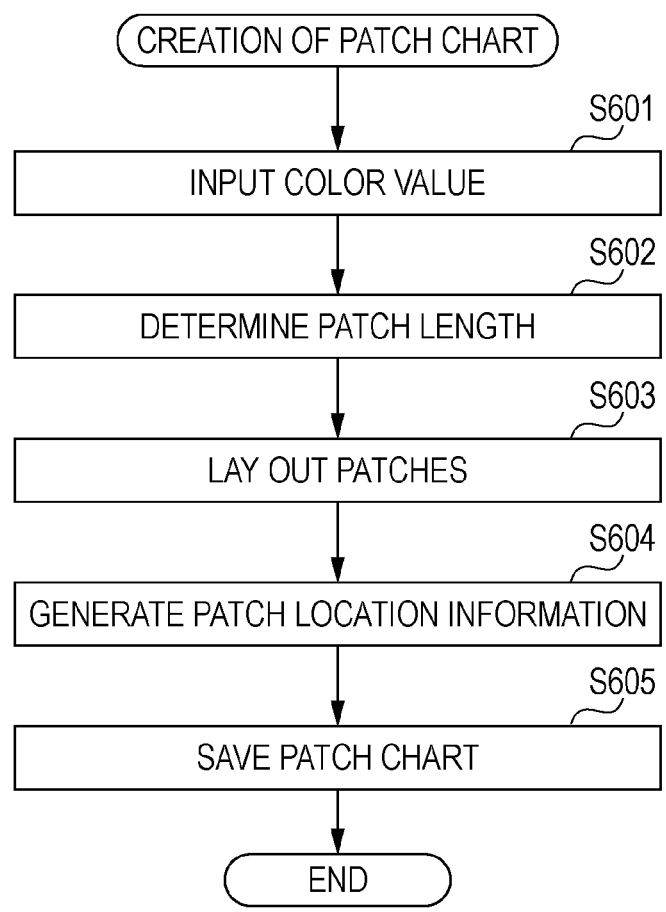
FIG. 6 is a diagram illustrating a flow for creating a patch chart.

Next, the creation of a patch chart in step S404, which is a feature of the present invention, will be described below in detail with reference to FIG. 6. A patch chart, which is patch image data, is created by the program stored in the storage 214 of the PC 21.

First, in step S601, input RGB values of patches are input as color data into the program. Each of these values is an RGB value described for each patch in the color value file specified in the area 502 in FIG. 5. In this embodiment, the case where each of R, G and B in the RGB values is 8-bit input data (0 to 255) is explained as an example. An example of color value data to be input is shown in FIG. 7. Note that, if "no color conversion" has been selected on the patch chart setting in S402, the original RGB values are used. If any color conversion has been selected, the RGB values to which the color conversion corresponding to the paper type is applied are used as input values.

In step S602, the patch length for each patch is determined from the input RGB value thereof by using equations. In this embodiment, RGB values, which are the most commonly used color data as input values of patches, are used. By using the equations described later, the length of the darkest patch, that is the patch having the highest optical density, is determined so as to have the maximum length. The patch length in this embodiment refers to the length of a patch in the moving direction of the sensor. Note that, in this embodiment, the patch lengths are determined from RGB values, however, the present invention is not limited to this. A value that affects the quantity of light received by the sensor, such as a spectral reflectance factor, an RGB value, or a CMYK value, may be used.

The patch length is determined by using the following equations.

$$x_1 = \frac{(\max(r, g, b) - \min(r, g, b))}{255} \quad (1)$$

$$x_2 = 1 - \frac{r + g + b}{255 \times 3} \quad (2)$$

$$P = \begin{cases} \alpha_1 x_1 + \beta & (\text{if } x_1 \geq x_2) \\ \alpha_2 x_2 + \beta & (\text{if } x_1 < x_2) \end{cases} \quad (3)$$

Here, max(r, g, b) represents the maximum value of input values r, g and b, and min(r, g, b) represents the minimum value of input values r, g and b. The value $X_1$ determined by equation (1) is a variable obtained by dividing the difference between the maximum value and the minimum value by 255 (digital count value). The value $X_1$ becomes 1 (maximum value) when r, g and b are a combination of R(255, 0, 0), G(0, 255, 0) and B(0, 0, 255) or a combination of C(0, 255, 255), M(255, 0, 255) and Y(255, 255, 0), which represent primary colors. The value $X_1$ becomes 0 (minimum value) when r=g=b, which represents an achromatic color. The value $X_2$ determined by equation (2) is a variable that becomes 1 (maximum value) when r=g=b=0, that is when the color is black, and becomes 0 when r=g=b=255, that is when the color is white. The patch length P is determined by equation (3). The coefficients $\alpha_1$ and $\alpha_2$ are used for weighting. The value β is an offset value and is the minimum patch length required for measurement. If $x_1 \geq x_2$, $x_1$ and $\alpha_1$ are used to determine the patch length P. If $x_1 < x_2$, $x_2$ and $\alpha_2$ are used to determine the patch length P. In this embodiment, values $\alpha_1$=4, $\alpha_2$=6 and β=2 are used as an example.

FIG. 8 shows the relationship between the patch length P obtained by the above equations and the input color values r, g and b. The value of the patch length P is stored temporarily in the storage 214 while being associated with a corresponding patch. Note that, in the case where the patch length is determined by a common equation which is used for all types of printing paper, as described above, the relationship between the actual color density and the patch length P is not clear since the color developed on the surface of a paper sheet differs depending on the type of printing paper. However, since the optical density tends to decrease when using, for example, a normal paper sheet having low color developability, the patch length can be varied with the type of printing paper by reducing the value β, which is an offset value. Similarly, since the optical density tends to increase when using an art paper sheet having high color developability, the value β is increased. Note that, although the case explained here is a case where RGB input is specified in S402, when CMYK input is specified, the patch length P is determined by equations created with the same concept.

Figure 9A:
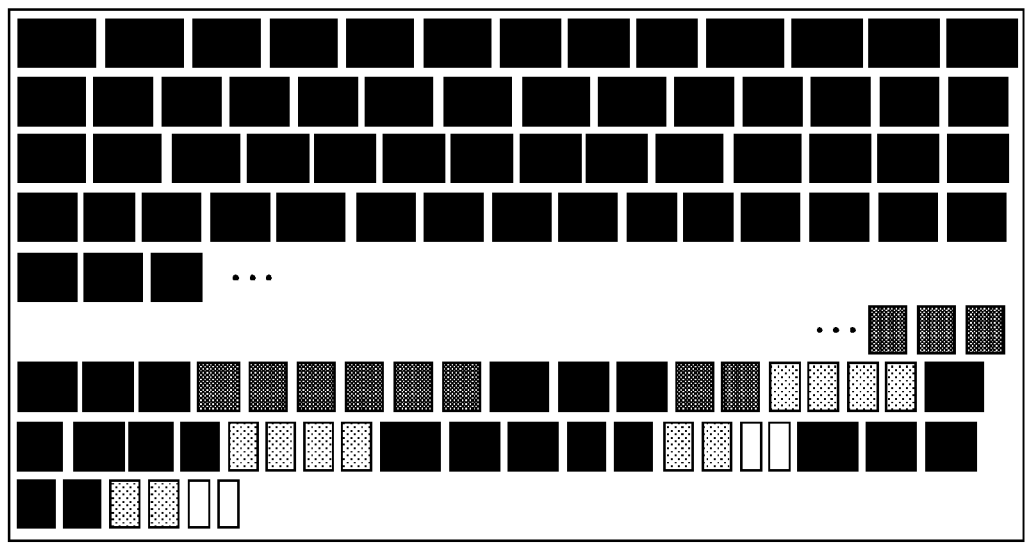
FIG. 9 is a diagram illustrating an example of a patch chart.
Figure 9B:
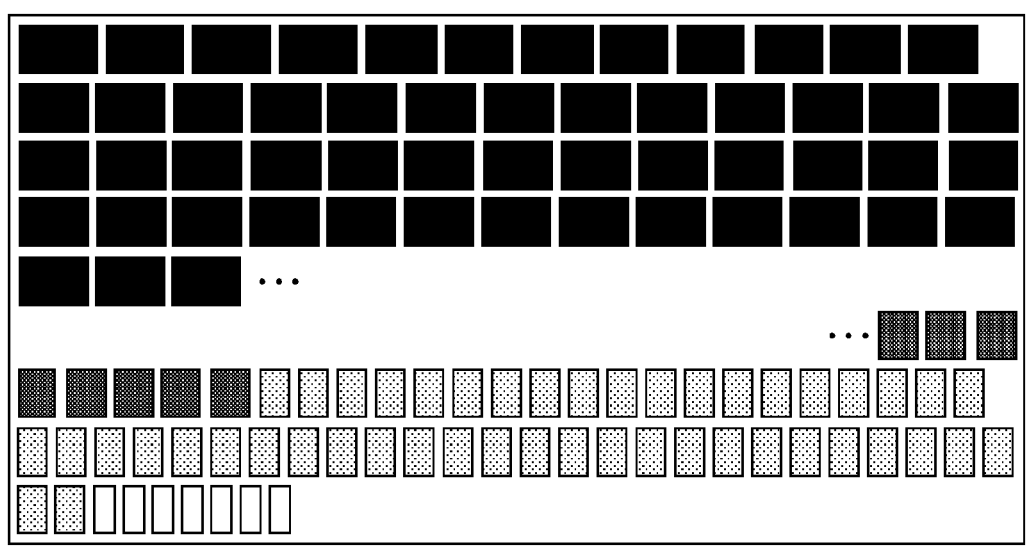

After the calculation of patch length is completed, patch layout is performed in step S603. The patch layout is performed in accordance with the setting regarding the patch chart measurement in step S402. If the patch sorting has been set to OFF in the patch measurement setting 503 in FIG. 5, patches are laid out in such a form that the patches are sorted in the order of input data in the direction of scanning, as shown in FIG. 9A. If the patch sorting has been set to ON, patches having the same size are continuously arranged in series, as shown in FIG. 9B. In particular, when high-density patches are printed first and then low-density patches are printed and measured, the measurement time can be assigned as drying time for the high-density patches. As a result, time between printing and measurement can be reduced. In addition, by laying out patches having the same patch length continuously, the patches having the same patch length can be measured all together as one block, and thus the sequence of the measurement can be simplified.

Next, in step S604, patch location information is generated. After the patch layout is completed, a coordinate at which the patch measurement starts and a coordinate at which the patch measurement ends, which are determined by the data on the patch length P for each patch, are stored in the storage 214 as patch location information. The patch location information is referred to for controlling the position of the sensor during the patch measurement.

Finally, in step S605, the data on the patch chart which has been laid out is stored in a predetermined region in the storage 214, and the process is completed.

The above description is provided for explaining the flow from the creation of a patch chart to the measurement thereof in the image processing system of this embodiment. With the present invention, when patches are measured while the sensor is moving relative to a recording medium, patch image data and location information for the measurement can be generated in accordance with the color data of the patches, and highly accurate measurement can be performed in a short time. Note that, while an ink-jet printer is used as a typical example in this embodiment, the present invention is not limited to this. A copying machine, an electrophotographic printer or the like may be used.

In addition, although in this embodiment the patch image data is generated by using the program stored in the storage 214, which is a storage unit, patch image data which has been generated in the same way and stored in the storage 214 may be used. In this case, the system functions as a printing system that prints the patch image data read from the storage 214 and measures the printed patch image by the sensor, which is a measuring unit.

Second Embodiment

In step S602 of First Embodiment, the patch length is determined by color data of the patch by using the equations. Meanwhile, a lookup table (hereinafter referred to as an LUT) for converting a color value of a patch to a patch length may be stored in advance to determine the patch length by referring thereto. A method for creating an LUT will be explained below.

First, patch lengths are calculated by using the equations in step S602 for 9×9×9=729 input RGB values in which each of the R, G and B values is varied in 9 steps. Then, an LUT is created by using a tetrahedral interpolation technique, which is an existing commonly-used technique. The LUT created in this way is stored in advance in the storage 214. Then, the LUT, which is used to convert an RGB value to a patch length, is referred to when the patch length is determined in step S602.

Alternatively, an LUT for converting a color value of a patch to a patch length may be stored for each paper type. This is because, since the color developed on paper differs depending on the type of paper to be printed, as described in step S602, the correspondence relationship between the actual color density and the patch length P can be maintained if an LUT is stored for each paper type.

Third Embodiment

The LUT in Second Embodiment is created by determining the patch length by the equations by using the color value of a patch to generate patch image data. However, an LUT may be created on the basis of the color density or the spectral reflectance factor measured for each patch printed on paper. A method of creating the LUT by measuring the spectral reflectance factor will be explained below.

Figure 10:
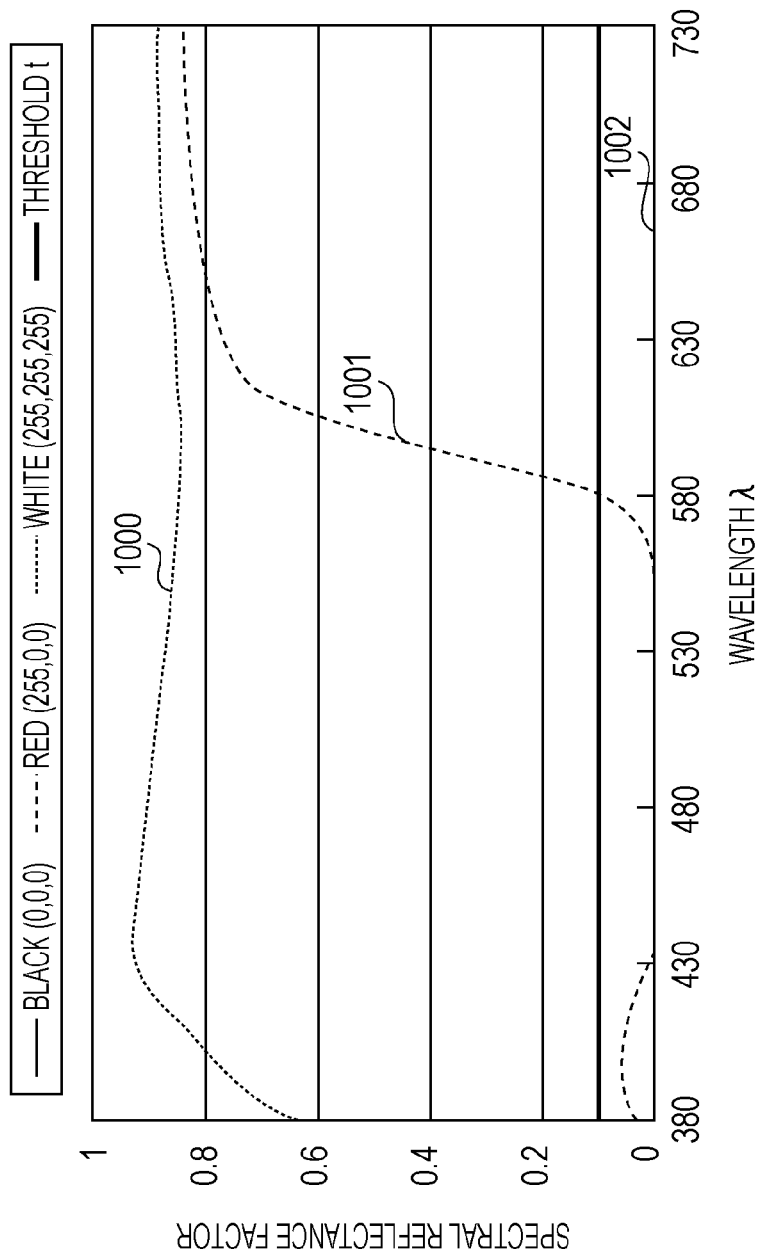
FIG. 10 is a diagram explaining a method for calculating a patch length by using spectral reflectance factor.

First, 9×9×9=729 patches, in which each of the R, G and B values is varied in 9 steps, are printed on a paper sheet on which the printer can print. Then, the spectral reflectance factor is measured for each patch by a colorimetric device. For the colorimetric device, it is advisable to use the same colorimetric device as that embedded in the printer. After the spectral reflectance factor is measured, the patch length is determined by using the measured spectral reflectance factor. FIG. 10 shows the spectral reflectance factors of the patches when patches having different input RGB values are printed on a certain paper sheet and the spectral reflectance factors thereof are measured. A line 1000 indicates a white patch having (r, g, b)=(255, 255, 255). A line 1001 indicates a red patch having (r, g, b)=(255, 0, 0). A line 1002 indicates a black patch having (r, g, b)=(0, 0, 0). A method for calculating a patch length by determining, for example, a wavelength region where the spectral reflectance factor is equal to or less than a predetermined threshold t and then determining the ratio thereof to the whole wavelength region may be conceivable. That is, a patch, such as a black patch of the line 1002, having a low spectral reflectance factor across the whole wavelength region has a spectral reflectance factor equal to or less than the threshold t across the whole wavelength region, and thus has the largest patch length. A patch, such as a white patch of the line 1000, having a high spectral reflectance factor has no spectral reflectance factor equal to or less than the threshold t, and thus has the smallest patch length. In addition, a patch, such as a red patch of the line 1001, having a low spectral reflectance factor in a particular region has the medium patch length. For example, when the threshold t is 0.1, the spectral reflectance factor in the wavelength region from 380 nm to 580 nm, among the whole wavelength region from 380 nm to 730 nm, becomes equal to or less than the threshold, and therefore the patch length is determined depending on the ratio.

LUTs created in this way are prepared in advance for every types of medium, and stored in the storage 214. When a patch length is calculated in step S602, an LUT, which converts an RGB value to a patch length, is referred to. Note that, the interpolation processing for the LUT is performed by using a tetrahedral interpolation technique, which is an existing commonly-used technique, or the like. Regarding the interpolation, the explanation will be omitted since the interpolation is not a feature of the present invention. In addition, although in this embodiment a patch length is determined by using one threshold, other methods, such as a method using multiple thresholds in stages, a method for determining a patch length on the basis of the information obtained by integrating a spectral reflectance factor by a wavelength, and a method using the minimum value of spectral reflectance factor, may be used as long as the same effects can be produced.

Fourth Embodiment

As another embodiment, the creation of an LUT in Second Embodiment may be performed by using paper that a user added, instead of using the printing paper prepared in advance in the printer driver. This can be realized by the user by adding paper that the user specifies and then performing the same method as Third Embodiment to create an LUT.

Specifically, when the paper is added, 9×9×9=729 patches, in which each of the R, G and B values is varied in 9 steps, are printed. Then, by using the same method as Third Embodiment, spectral reflectance factors for the patches are measured by the colorimetric device, and an LUT for the added paper is created. The created LUT is stored in the storage 214 while being associated with the added paper, and is referred to when a patch length is determined by using the paper.

Fifth Embodiment

Figure 11:
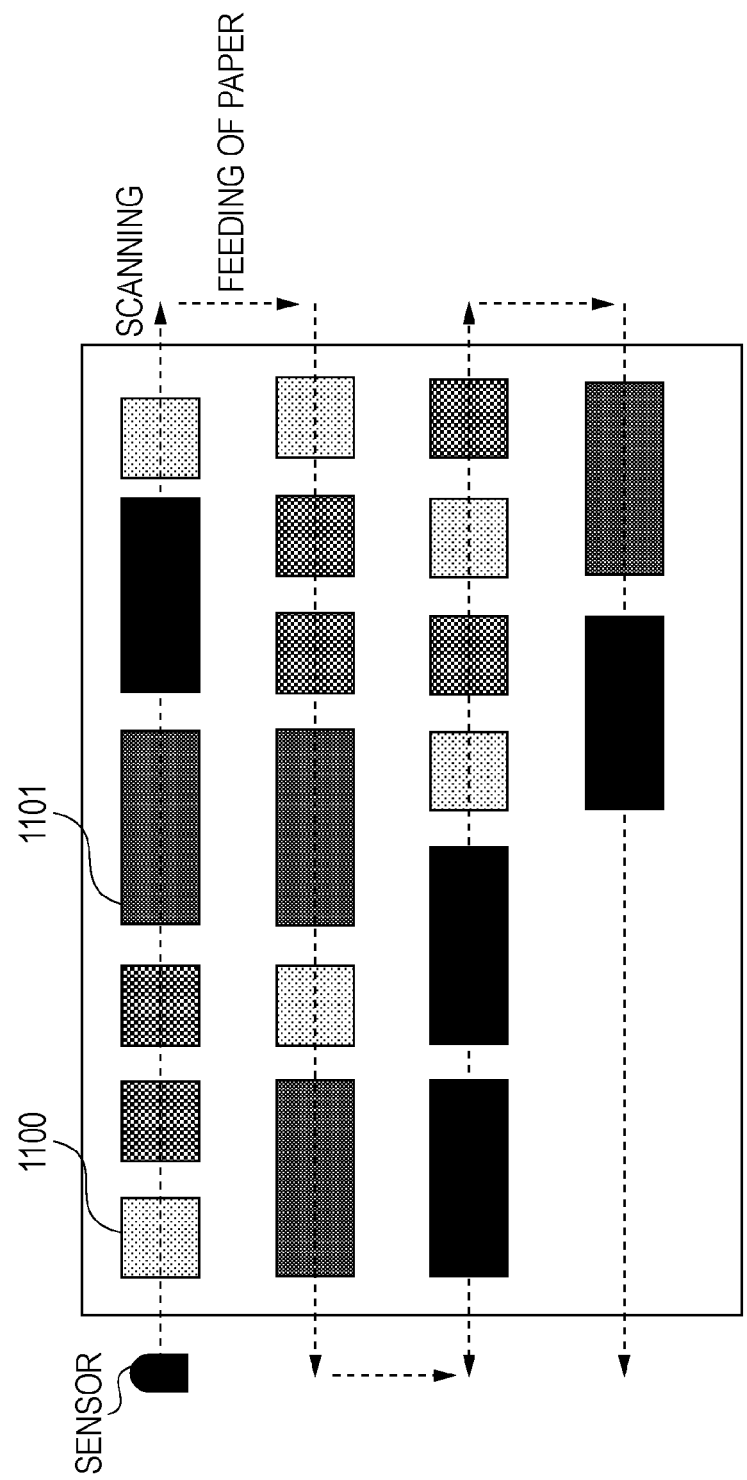
FIG. 11 is a diagram illustrating an example of a patch chart having two patch lengths.

In First Embodiment and Third Embodiment, the methods for determining multiple patch lengths by using input RGB values or spectral reflectance factors are explained, but a simpler configuration may be conceivable. For example, a standard patch length is set in advance, and a patch is handled as a patch having a large patch length only when the value P, which can be determined by using the equations using the input RGB value of a patch, exceeds a predetermined threshold, and handled as a patch having the standard patch length when the value P does not exceed the predetermined threshold. FIG. 11 shows an example of a patch chart having two patch lengths. In this case, a patch 1100 is a first optical-density patch having a standard patch length. Meanwhile, a patch 1101 is a second optical-density patch having an optical density higher than that of the first optical-density patch and a patch length larger than the standard patch length. By configuration a patch chart in such a form, an advantage is obtained in that the patch location control during measurement can be performed more easily.

(Other Embodiment)

In the above-mentioned embodiments, the configuration example in which the sensor moves over a recording medium is given, but the present invention is not limited to this. Any configuration may be used as long as patches are optically measured while a relative movement between a recording medium and a sensor is being performed. For example, a configuration in which the measurement is performed while a recording medium is moving relative to a fixed sensor may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-290105 filed Dec. 22, 2009, which is hereby incorporated by reference herein in its entirety.

What is claimed is:

1. A printing system comprising:
    a printing unit configured to print a plurality of patches including a first patch and a second patch having an optical density lower than that of the first patch on a print medium; and
    a sensor configured to measure each of the plurality of the patches while moving relative to the printing medium at a predetermined speed,
    wherein the sensor receives a quantity of light for which it sets a value and, a length of the first patch and a length of the second patch is determined using the value set by the sensor for the quantity of light received,
    wherein a length of the first patch, having the optical density higher than the second patch, in a relative movement direction between the plurality of the patches and the sensor, is longer than the length of the second patch having the lower density in the relative movement direction, and
    wherein the printing unit prints the second patch having the lower optical density than the first patch after printing the first patch having the length longer than the length of the second patch, and the sensor reads the first patch having the optical density higher than the second patch, after reading the second patch.

2. The printing system according to claim 1, wherein each of lengths of the plurality of patches is longer when having the higher optical density in the relative movement direction.

3. The printing system according to claim 1, wherein the sensor is attached to a movable carriage.

4. The image processing system according to claim 1, wherein each length of the direction which intersects with the relative movement direction of the plurality of the patches are same.

5. The printing system according to claim 1, wherein the predetermined speed is constant.

6. The printing system according to claim 1 further comprising,
    a processing apparatus configured to determine the length of the relative movement direction based on the value of gradation amount of each of the plurality of the patches.

7. A printing system according to claim 1,
    wherein the printing unit performs printing to the print medium by inkjet method.

8. A method to control a printer for printing a plurality of patches comprising:
    causing a printing unit of the printer to print the plurality of the patches including a first patch and a second patch having an optical density lower than that of the first patch on a printing medium; and
    causing a sensor of the printer to measure each of the plurality of the patches while moving relative to the printing medium at a predetermined speed;
    wherein the sensor receives a quantity of light for which it sets a value and, a length of the first patch and a length of the second patch is determined using the value set by the sensor for the quantity of light received,
    wherein the length of the first patch, having the optical density higher than the second patch, is determined by the sensor, in a relative movement direction between the plurality of the patches and the sensor, is longer than the length of the second patch having the lower optical density in the relative movement direction, and
    wherein the printing unit is caused to print the second patch having the lower optical density than the first patch after printing the first patch having the length longer than the length of the second patch, and the sensor reads the first patch having the optical density higher than the second patch, after reading the second patch.

9. The method according to claim 8, wherein the predetermined speed.

10. The method according to claim 8, further comprising, causing a processing apparatus to determine the length of the relative movement direction based on color values of each of the plurality of the patches.

11. The method according to claim 10, wherein the color values are RG B values.

12. The method according to claim 8, wherein the length of each of plurality of the patches is longer when having the higher optical density in the relative movement direction.

13. The method according to claim 8, wherein the sensor is attached to a movable carriage.

14. The method according to claim 8, wherein the length of plurality of the patches of the direction which intersects with the relative movement direction is the same.

* * * * *